(12) United States Patent
Ferlitsch

(10) Patent No.: US 7,447,365 B2
(45) Date of Patent: Nov. 4, 2008

(54) SYSTEMS AND METHODS FOR MIXED RASTER CONVERSION IN DIRECT PRINTING

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1022 days.

(21) Appl. No.: 10/774,029

(22) Filed: Feb. 6, 2004

(65) Prior Publication Data

US 2005/0175249 A1 Aug. 11, 2005

(51) Int. Cl.
*G06K 9/36* (2006.01)
*G06K 9/46* (2006.01)

(52) U.S. Cl. ........................ 382/232; 382/176

(58) Field of Classification Search ................. 382/176, 382/232
See application file for complete search history.

(56) References Cited

U.S. PATENT DOCUMENTS

| | | | | |
|---|---|---|---|---|
| 6,429,948 | B1* | 8/2002 | Rumph et al. .............. | 358/1.15 |
| 2001/0052131 | A1* | 12/2001 | Hobson et al. .............. | 725/105 |
| 2002/0076103 | A1 | 6/2002 | Lin et al. | |
| 2002/0099884 | A1* | 7/2002 | Chang et al. .................. | 710/62 |
| 2002/0168105 | A1 | 11/2002 | Li | |
| 2002/0191220 | A1 | 12/2002 | Czyszczewski et al. | |
| 2003/0048954 | A1 | 3/2003 | Matthews | |
| 2003/0088642 | A1* | 5/2003 | Price et al. .................. | 709/218 |
| 2003/0123729 | A1 | 7/2003 | Mukherjee et al. | |

FOREIGN PATENT DOCUMENTS

| | | |
|---|---|---|
| EP | 1 213 684 A2 | 6/2002 |
| JP | 6-3083825 | 4/1988 |
| JP | 2001-312377 | 11/2001 |

* cited by examiner

*Primary Examiner*—Matthew C. Bella
*Assistant Examiner*—John B Strege
(74) *Attorney, Agent, or Firm*—Madson & Austin

(57) ABSTRACT

A system for compressing image data being sent to an imaging device is disclosed. The system includes a computing device with executable instructions. The executable instructions are executable on the computing device and are configured to implement a method for compressing image data being sent to an imaging device. Capabilities of an imaging device are obtained. Image data is decompressed upstream from a rasterization process of the imaging device. The image data is divided into one or more regions based on image data content. A compression algorithm is selected for each region based on content of each region and on the capabilities of the imaging device. The image data is compressed per region using one or more selected compression algorithms. The compressed regions are assembled into a mixed raster format.

27 Claims, 8 Drawing Sheets

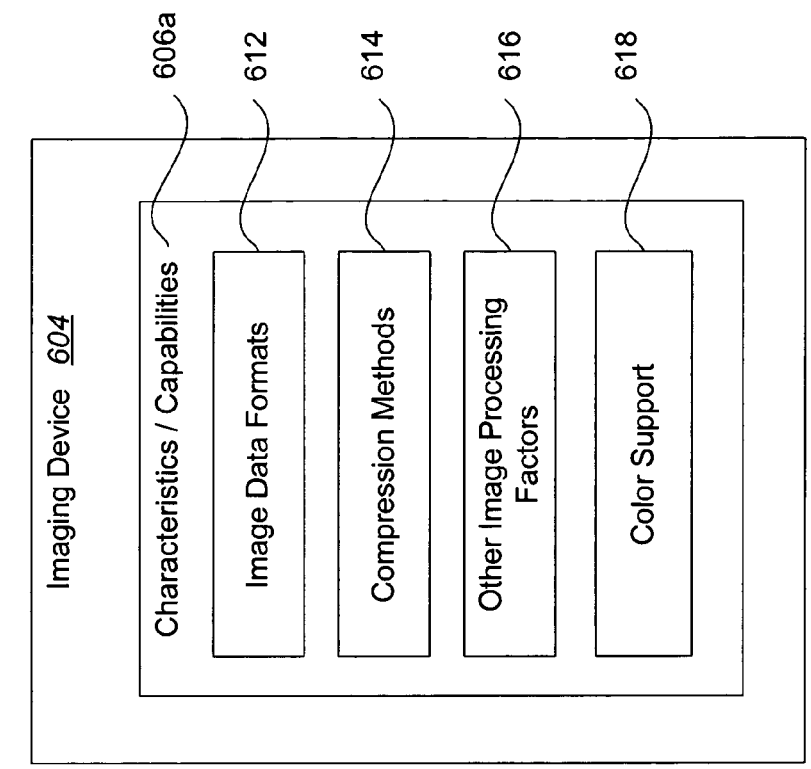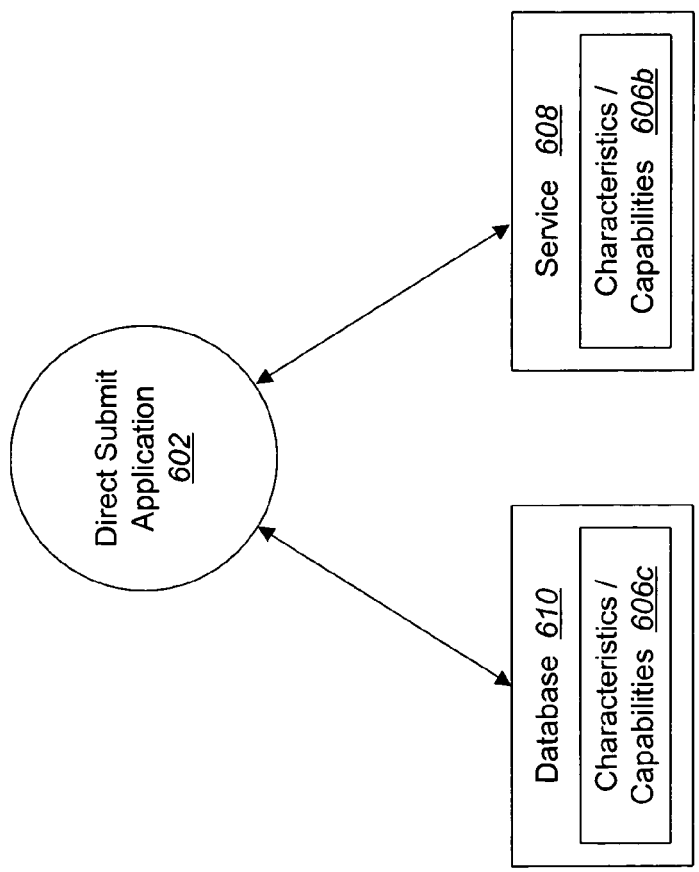
FIG. 6

US 7,447,365 B2

SYSTEMS AND METHODS FOR MIXED RASTER CONVERSION IN DIRECT PRINTING

TECHNICAL FIELD

The present invention relates generally to imaging jobs sent to imaging devices through use of a computer. More specifically, the present invention relates to systems and methods for mixed raster conversion in direct printing.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, or a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals, a printer pool, a printer cluster, a fax machine, a plotter, a scanner, a logical device, an electronic whiteboard, a tablet PC, a computer monitor, a file, etc.

Different kinds of computer software facilitate the use of imaging devices. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

In certain computing environments, it is desirable to be able to reduce the size of the imaging job after it has been generated. Being able to compress the imaging job may be useful for a variety of reasons including, but not limited to, bandwidth requirements for the network and/or for communication ports and/or storage requirements. Benefits may be realized by providing improved systems and methods for compressing an imaging job.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 6 is a logical block diagram illustrating the segmentation and compression process obtaining an imaging device's characteristics and/or capabilities;

DETAILED DESCRIPTION

Figure 1:
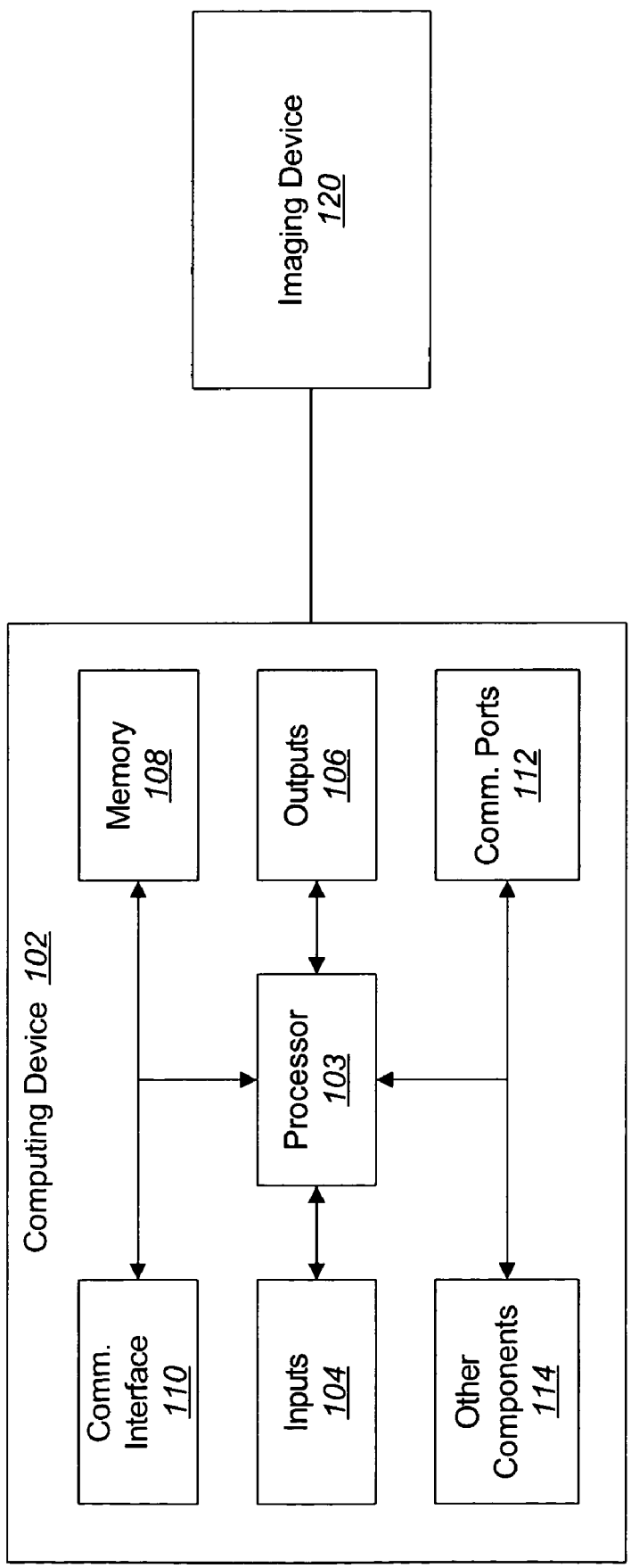
FIG. 1 is a block diagram illustrating the major hardware components typically utilized with embodiments herein.

A method for compressing image data being sent to an imaging device is disclosed. Capabilities of an imaging device are obtained. Image data is decompressed upstream from a rasterization process of the imaging device. The image data is divided into one or more regions based on image data content. A compression algorithm is selected for each region based on content of each region and on the capabilities of the imaging device. The image data is compressed per region using one or more selected compression algorithms. The compressed regions are assembled into a mixed raster format.

A plurality of region types may be stored and a plurality of candidate compression algorithms may be associated with each region type. Compression rankings may be used in selecting a compression algorithm for each region. The mixed raster format of the image data may be sent downstream to a rasterization process of the imaging device.

In one embodiment, data in each region may share a common characteristic such that when the data is compressed by a lossy algorithm all the data in the region shares the same output quality. The image data may be divided into one or more regions based on text, line art, graphics, luminous planes, color planes, backgrounds and foregrounds.

The capabilities may comprise supported image file formats, supported compression methods, supported image rendering and enhancement methods, and supported color spaces and gamuts. The capabilities of the imaging device may be obtained directly from the imaging device. In addition, the capabilities of the imaging device may be obtained by querying an imaging service. The capabilities of the imaging device may be obtained by querying an imaging device database.

A system for compressing image data being sent to an imaging device is disclosed. The system includes a computing device with executable instructions. The executable instructions are executable on the computing device and are configured to implement a method for compressing image data being sent to an imaging device. Capabilities of an imaging device are obtained. Image data is decompressed upstream from a rasterization process of the imaging device. The image data is divided into one or more regions based on image data content. A compression algorithm is selected for each region based on content of each region and on the capabilities of the imaging device. The image data is compressed per region using one or more selected compression algorithms. The compressed regions are assembled into a mixed raster format.

The capabilities of the imaging device may be obtained by querying a process that is not part of the imaging device. The computing device may be in electronic communication with the imaging device and the mixed raster format of the image data may be sent to the imaging device.

A computer-readable medium for storing program data is also disclosed. The program data comprises executable instructions for implementing a method in a computing device for compressing image data being sent to an imaging device. Capabilities of an imaging device are obtained. Image data is decompressed upstream from a rasterization process of the imaging device. The image data is divided into one or more regions based on image data content. A compression algorithm is selected for each region based on content of each region and on the capabilities of the imaging device. The image data is compressed per region using one or more selected compression algorithms. The compressed regions are assembled into a mixed raster format. The mixed raster format of the image data may be sent downstream.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating the major hardware components typically utilized with embodiments herein. The systems and methods disclosed may be used with a computing device 102 and an imaging device 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106. The processor 103 is operably connected to input 104 and/or output devices 106 capable of electronic communication with the processor 103, or, in other words, to devices capable of input and/or output in the form of an electrical signal. Embodiments of devices 102 may include the inputs 104, outputs 106 and the processor 103 within the same physical structure or in separate housings or structures.

The electronic device 102 may also include memory 108. The memory 108 may be a separate component from the processor 103, or it may be on-board memory 108 included in the same part as the processor 103. For example, microcontrollers often include a certain amount of on-board memory.

The processor 103 is also in electronic communication with a communication interface 110. The communication interface 110 may be used for communications with other devices 102, imaging devices 120, servers, etc. Thus, the communication interfaces 110 of the various devices 102 may be designed to communicate with each other to send signals or messages between the computing devices 102.

The computing device 102 may also include other communication ports 112. In addition, other components 114 may also be included in the electronic device 102.

Of course, those skilled in the art will appreciate the many kinds of different devices that may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 1 is only meant to illustrate typical components of a computing device 102 and is not meant to limit the scope of embodiments disclosed herein.

The computing device 102 is in electronic communication with the imaging device 120. An imaging device 120 is a device that receives or transmits an imaging job, such as a Multi-Function Peripheral ("MFP") or computing device. Imaging devices include, but are not limited to, physical printers, multi-functional peripherals, a printer pool, a printer cluster, a fax machine, a plotter, a scanner, a copier, a logical device, a computer monitor, a file, an electronic whiteboard, a tablet PC, a document server, etc. The imaging device may be a single or a plural grouping (e.g., pool or cluster) of two or more devices.

In light of the definition of an imaging device 120 above, the term imaging job, as used herein, is broadly defined as any instruction or set of instructions that are sent to an imaging device to cause an image to be printed, imaged, scanned, sent, etc., to or from the imaging device 120. Thus, the term imaging job includes, but is not limited to, a fax instruction or job to send a fax, a print job to print to a file, a print job to print to a particular window in a graphical user interface, a print job to render an electronic image in an electronic ink display device (e.g., eBook), a scan job to scan in an image from a scanner, a print job to print to a physical printer, a document manipulation job, a document conversion job, etc. Print jobs and printing devices are used to illustrate exemplary embodiments, but other kinds of imaging jobs and imaging devices may be used in implementations of the embodiments disclosed herein.

Figure 2:
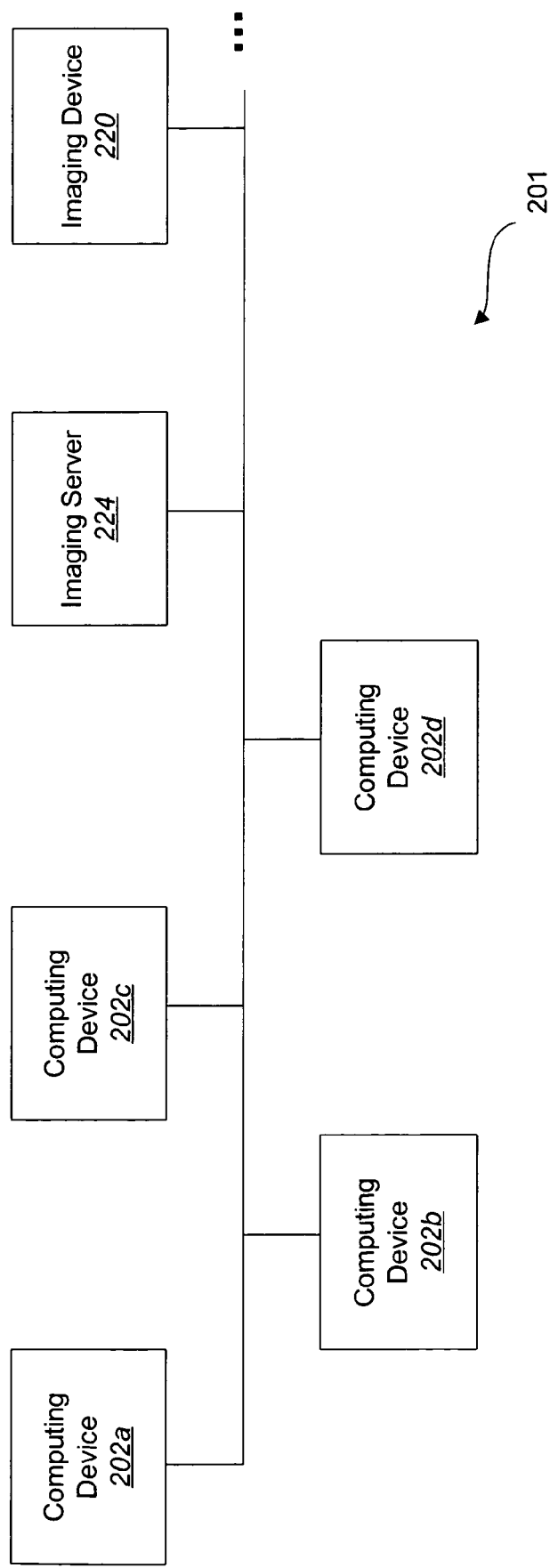
FIG. 2 is a network block diagram illustrating one possible environment in which the present systems and methods may be implemented.

FIG. 2 is a network block diagram illustrating one possible environment in which the present systems and methods may be implemented. The present systems and methods may also be implemented on a standalone computer system. FIG. 2 illustrates a computer network comprising a plurality of computing devices 202, an imaging device 220 and an imaging server 224.

This invention is independent of the job control command and image data language and syntax. For example, the job control language may be PJL and the imaging job data language may be PCL or Postscript.

Herein, reference to computing devices that construct and despool an imaging job to, or receive from, either an imaging device or server, will be referred to as imaging clients. Herein, reference to computing devices that manage an imaging device and receive imaging jobs and respool the imaging job to/from an imaging device, will be referred to as imaging servers.

References to computing devices that construct and despool an imaging job to either an imaging device or server, will be referred to as client computing devices (i.e., client). Herein, reference to computing devices that centrally manage a shared imaging device by receiving despooled imaging jobs from multiple client computing devices and re-despools the imaging job to the imaging device, will be referred to as server computing devices (i.e., server).

The embodiments disclosed operate independently of how the imaging job is initiated. For example, a print job may be initiated by an application using a printer driver, which spools a print job to the print spooler. By way of further example, the print job may be initiated by direct printing using a utility that generates a print job ticket and despools the document data and job ticket directly to the printer.

The systems and methods herein are independent of the method to initiate the imaging job and the method to despool the image job and/or imaging result to/from the imaging client and imaging device. For example, an imaging job may be generated by a printer driver from an application. The application would convert the document into printing instructions, such as GDI (i.e., Graphics Device Interface) in the Microsoft Windows® family of operating systems. The printing instructions would then be passed to a printer driver installed on the client and/or server associated with the printing device. The printer driver would then convert the printing instructions into a printer dependent format, such as a raster image or PDL (i.e., Page Description Language). In other cases, such as Direct Printing, the document format can be directly interpreted by the printer and there is no preprocessing of the document format into a printer dependent format.

The systems and methods of embodiments of the present invention typically comprise one or more printing devices, which may be connected locally, through a network or through a remote printing environment. These systems and methods may further comprise a computing device capable of generating or transmitting a print job to a printing device or transmitting the location of a print job to a printing device as in "pull printing." These embodiments may also comprise a printer driver, a spooler, a print processor and other print system components that process, transmit or otherwise function to produce a print job. In some embodiments, these components may exist in a Microsoft Windows 98, Me, NT, 2000, XP, 2003 Server® or similar operating system. Details of these operating system print system components and processes may be obtained by reference to the Microsoft Windows Driver Development Kits (DDKs) and associated documentation, which are hereby incorporated herein by reference.

Embodiments which utilize a Microsoft Windows® operating system generally comprise a printer driver, spooler, print processor, port monitor and other print system components which process print tasks generated through the operating system and applications running on the operating system. Embodiments used in conjunction with other operating systems will utilize print system components with similar functions, which may be referred to by the terms used in Microsoft systems.

Exemplary embodiments will be described with terminology related to a Microsoft Windows® environment, however these terms shall relate to equivalent elements in other operating systems. For example, the print processor described in many embodiments will relate to a print processor common in the Windows environment as well as elements with equivalent functions in other operating systems.

The definitions in this and subsequent paragraphs apply throughout this specification and related claims. The term "print job" may refer to any combination of data that can be printed. A print job may comprise text, line art and/or graphics and may comprise part of a page, a single page or many pages. Print jobs may be rendered or un-rendered. Generally, a print job is generated by an application, such as a word processor, spread sheet, etc., however, a print job may also comprise a file or data in memory that may be sent directly to a print process.

The term "network" may refer to any combination of computing devices and peripherals, such as printing devices, wherein the devices can communicate with each other. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods.

To simplify discussion of a printing system used under a Microsoft Windows® operating system, some groups of system components may be referred to collectively. Some components may also be referred to generically by their group name. For example, a spooler API server may be referred to as a spooler. A group of components comprising a spooler client interface, spooler API server, router, print job creation API and job scheduling API may be referred to as a spooler in a Windows NT/2000 operating system. A group of components comprising a language monitor, port monitor and port driver stack may be referred to as a port manager. A group of components comprising a file format director and EMF print processor DLL may be referred to as a print processor. Equivalent component groups may be referred to by these terms also whether in a Microsoft operating system or another system.

References to a Microsoft Windows or Windows operating system may refer to any version or variation of a Microsoft Windows operating system comprising Windows 95, Windows 98, Windows NT, Windows 2000, Windows ME, Windows XP, Windows 2003 Server and others. While exemplary embodiments may be directed to a Windows operating system and environment, systems and methods directed to other operating systems such as Macintosh, UNIX, DOS, Linux, MVS, AS/400 and others are to be contemplated within the scope of the present invention.

Embodiments may be embodied in software, firmware, hardware and other forms that achieve the function described herein. As embodiments may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

In a typical printing environment, a user may initiate a print job, which generally comprises a single document generated by an application that is to be printed. In some embodiments, a user may also initiate a print task, which may comprise one or more documents consisting of one or more pages each. A print task may also comprise multiple copies of a print job. A print job or task may be pre-processed into printer-ready data, such as output in a page description language (PDL) such as Printer Control Language (PCL), Adobe Postscript®, Adobe Portable Document Format (PDF) and Tagged-Image File Format (TIFF) as non-limiting examples. A print job or task may also be journaled. In a journaled print job or task, rendering instructions are recorded for subsequent playback. Some examples of journaled formats are Enhanced Metafile (EMF) and Sharp's Printer Meta File (PMF).

Generally, when a print job or task is initiated, a user makes an input selection to initiate the process. The computing device may respond with the display of a dialog such as a print dialog box, a command line query, a panel display or some other form of user interface that allows a user to select print task options. One option may be the selection of the printing device such as a printer, plotter, Multi-Function Peripheral (MFP), CD burner or other device. Once the printing device is selected, a driver and, optionally, a print processor and other print system components may be loaded. Once the driver and/or other print system components are loaded, an additional dialog may be presented to prompt a user of options available on the selected device. Options such as print quality, paper size, orientation, tray selection, manual feed, stapling, watermarks, cluster printing, pool printing and other options may be selected.

In some embodiments of the present invention, print system components may present the user with a dialog that provides print job or print task interleaving options. Other embodiments may automatically select interleaving options for print jobs or tasks.

Once printing options have been selected or otherwise established, either manually or automatically, print job or task processing may commence. Print job or task processing may comprise construction of print job or print task specific information by the printer driver. This may comprise device initialization and environment data such as DEVMODE data in a Microsoft Windows environment. Rendering instructions are then compiled and either recorded for deferred playback (journaled data) or processed into printer-ready data. In some cases, a print task may be partially or wholly rendered into printer-ready data in a previous step and the compilation of rendering instruction may be skipped or partially skipped.

The output from a print driver, in a spooled print environment, may be referred to as a spool file and its contents may be referred to as spool data. A spool file may be recorded on disk, in memory, in cache or other storage media compatible with a computing device. In embodiments herein, a spool file may comprise interleaving data. Interleaving data may comprise printer output mode options such as, but not limited to, output tray options, output page orientation, output page location, media selection or other criteria affecting aspects of printing device output.

When the spool file is complete, control is passed from the driver to another print system component, such as a print spooler. In some systems, control is passed, immediately or delayed, from the print spooler to a print processor, which may determine whether the data is in a printer-ready format and process the data accordingly. If the data is in a printer-ready format, it may be sent to the port of the selected printing device. If the data is journaled, it may be further processed into a printer-ready format. This process may be referred to as spooling/de-spooling as the data is spooled from the spool file to a spooler and subsequently de-spooled to its destination. Once journaled data is processed into printer-ready data, it may be de-spooled to the port associated with its destination printing device.

Figure 3:
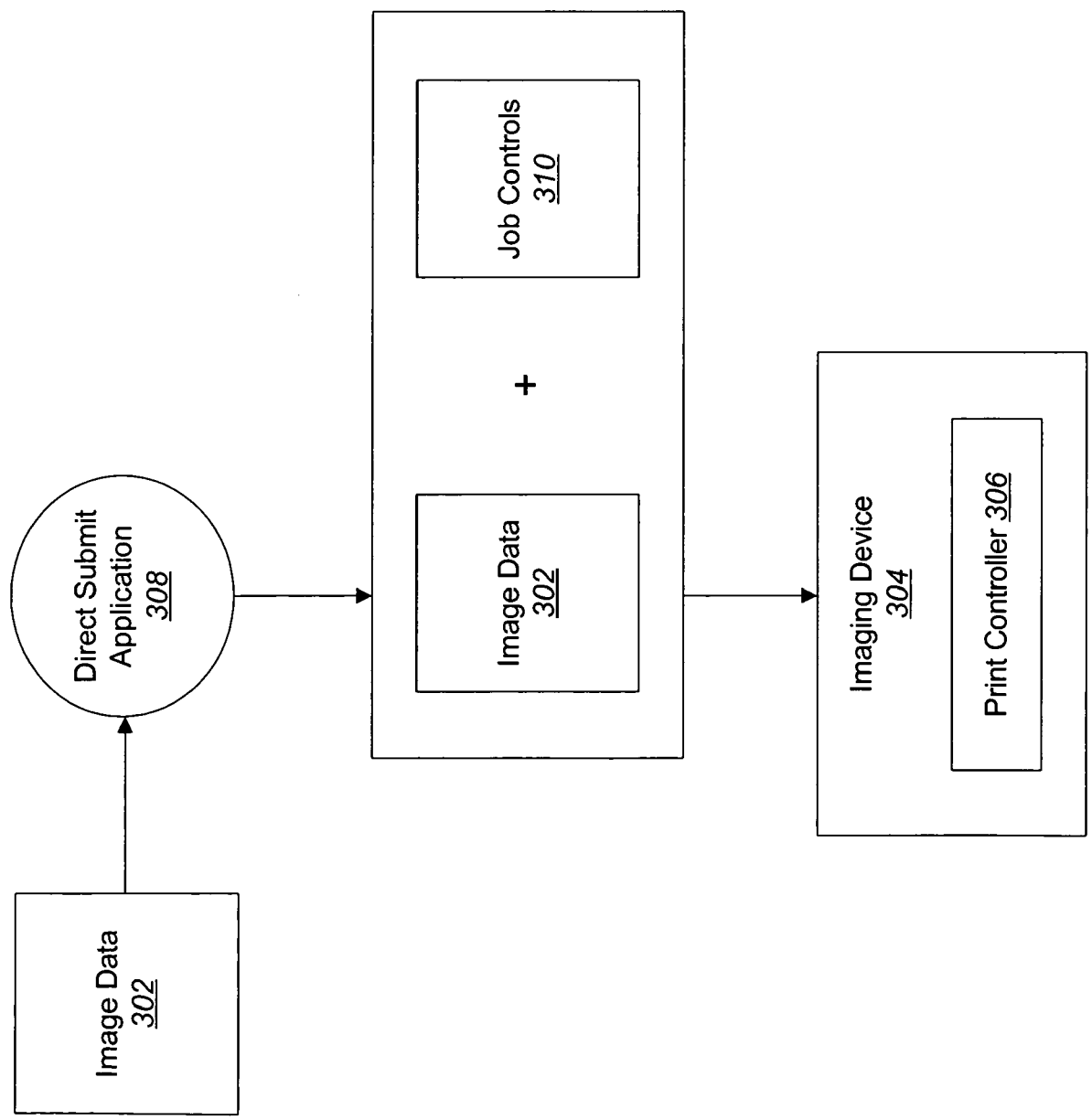
FIG. 3 is a logical block diagram to provide a context for the systems and methods herein.

FIG. 3 is a logical block diagram illustrating the context of the systems and methods herein. When a user desires to print image data 302, such as a digital photograph, the image data 302 is converted to a raster image format (i.e., RIP) compatible with the printer's engine. This conversion may happen upstream from the printer 304, such as in a printer driver, or downstream in the printer 304, such as in the print controller 306. In one method of the latter case, the print controller 306 has the capability to accept the image data 302 in the native image data format (i.e., no upstream PDL conversion required) and convert the image data 302 into raster data. Typically, this method is referred to as direct printing or direct submission. The process and/or software that submits the image data 302 to the imaging device 304 is referred to as a direct submit application 308. The print controller 306 may also accept additional information, such as job control commands 310, wrapped with or embedded within the image data 302.

Typically, the image data 302 sent to the printer 304 is in a compressed format. The compressed format results in better performance when transmitted over the network, or local port, to the printer 304 and lower storage requirements on the printer 304.

Traditionally, the entire image data 302 is compressed using a single compression method. The amount of compression, and resulting performance, varies with both the compression method and the image data 302 content. Thus, an arbitrary selection of a compression method and application across the entire image data 302 may not result in the best performance.

Further, if one compression method can be assumed to be of better performance over another, the quality of the output may be unpredictable. That is, modern compression methods achieve the high rates of compression by discarding some information (i.e., lossy compression). The effect on the quality of the output when some information is discarded is dependent on the image content. That is, a better performance compression may result in a lower quality output.

Thus, there is a desire to select a compression method on a per region basis of the image data 302 (i.e., mixed raster) based on the image data content and printer characteristics/capabilities, such that the best performance can be achieved without a loss in output quality.

Figure 4:
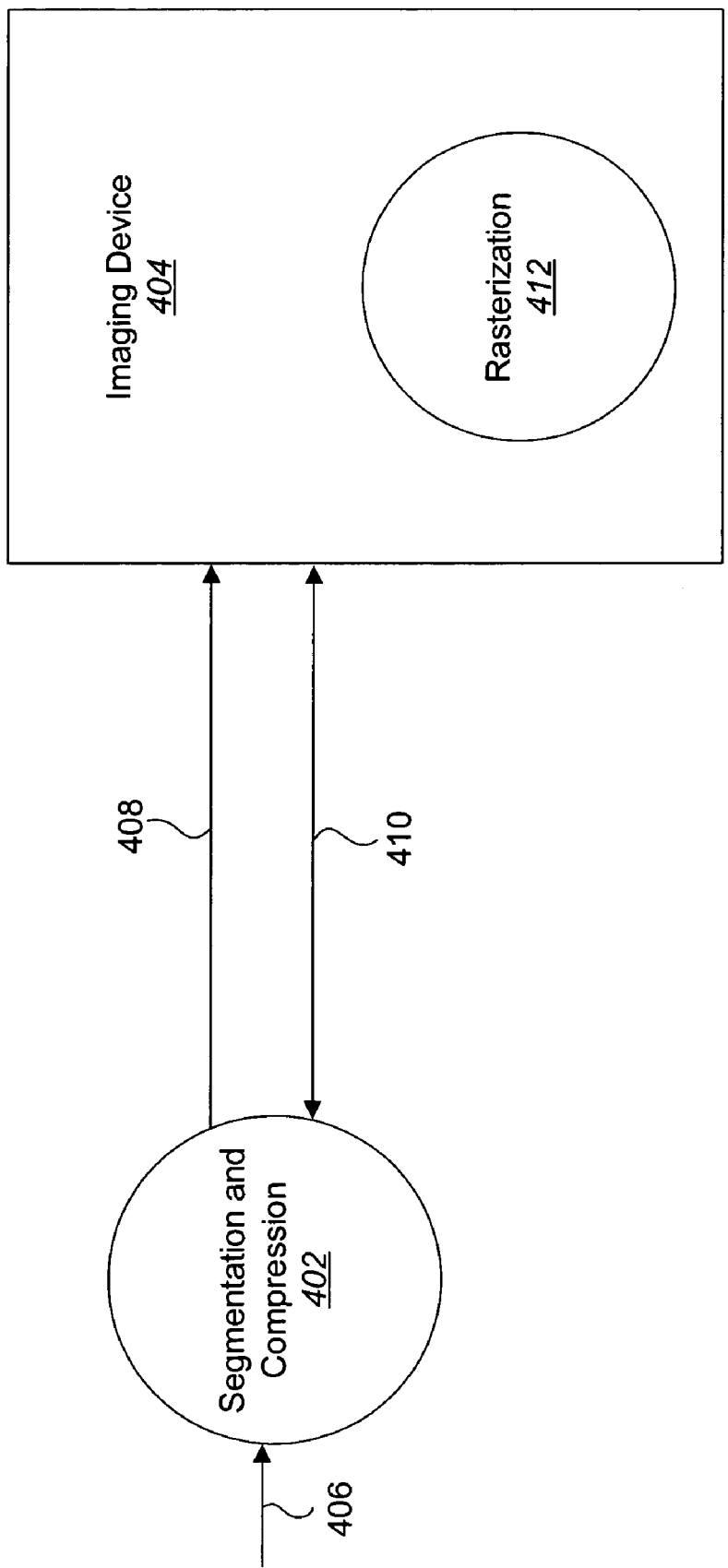
FIG. 4 is a logical block diagram of a segmentation and compression component.

Referring now to FIG. 4, this system provides an effective method for compressing image data that is sent to a printer for direct printing to achieve the best performance without a loss in output quality. A segmentation and compression process 402 receives compressed image data 406. The segmentation and compression process 402 decompresses the image data 406 and then divides the image data into one or more regions.

Further the process 402 compresses the image data per region and assembles them into a mixed raster format 408. The segmentation and compression process 402 queries 410 the imaging device 404 or other process or service to determine the capabilities of the device 404 so that is may determine the appropriate compression algorithm(s) to use. Further details about the segmentation and compression process 402 will be described below in relation to the remaining Figures.

The upstream process 402 may be on any host such as any personal computer, mini or mainframe computer or a thin client such as a PDA. The system 402 and method described herein may be implemented on one or more computers or on one or more electronic devices. In addition, a computer network may be involved. A segmentation and compression process 402 or set of instructions is upstream from the point at which the image data is converted into a raster format and printed. In one embodiment the process 402 is upstream from the imaging device's rasterization process 412. Further, the process 402 may be implemented inside the device's print controller 306, such as when the device's print controller is external to the device's print engine (e.g., RIP server) and the printer engine ready data is transmitted over a network or local connection (e.g., parallel, serial, USB port).

Various embodiments of the segmentation and compression process 402 will be described and illustrated below. The segmentation and compression process 402 may be implemented in various ways, including embodiments where it is part of the operating system or where it is not part of the operating system. In addition, the process 402 may comprise more than one software or hardware component, or the functionality of the process 402 may be achieved by one or more pre-existing components that have been modified accordingly. The segmentation and compression process 402 may be implemented on a host computing device, the imaging device, an intermediate component interspersed between the host and device, or distributed across multiple devices and/or components.

Figure 5:
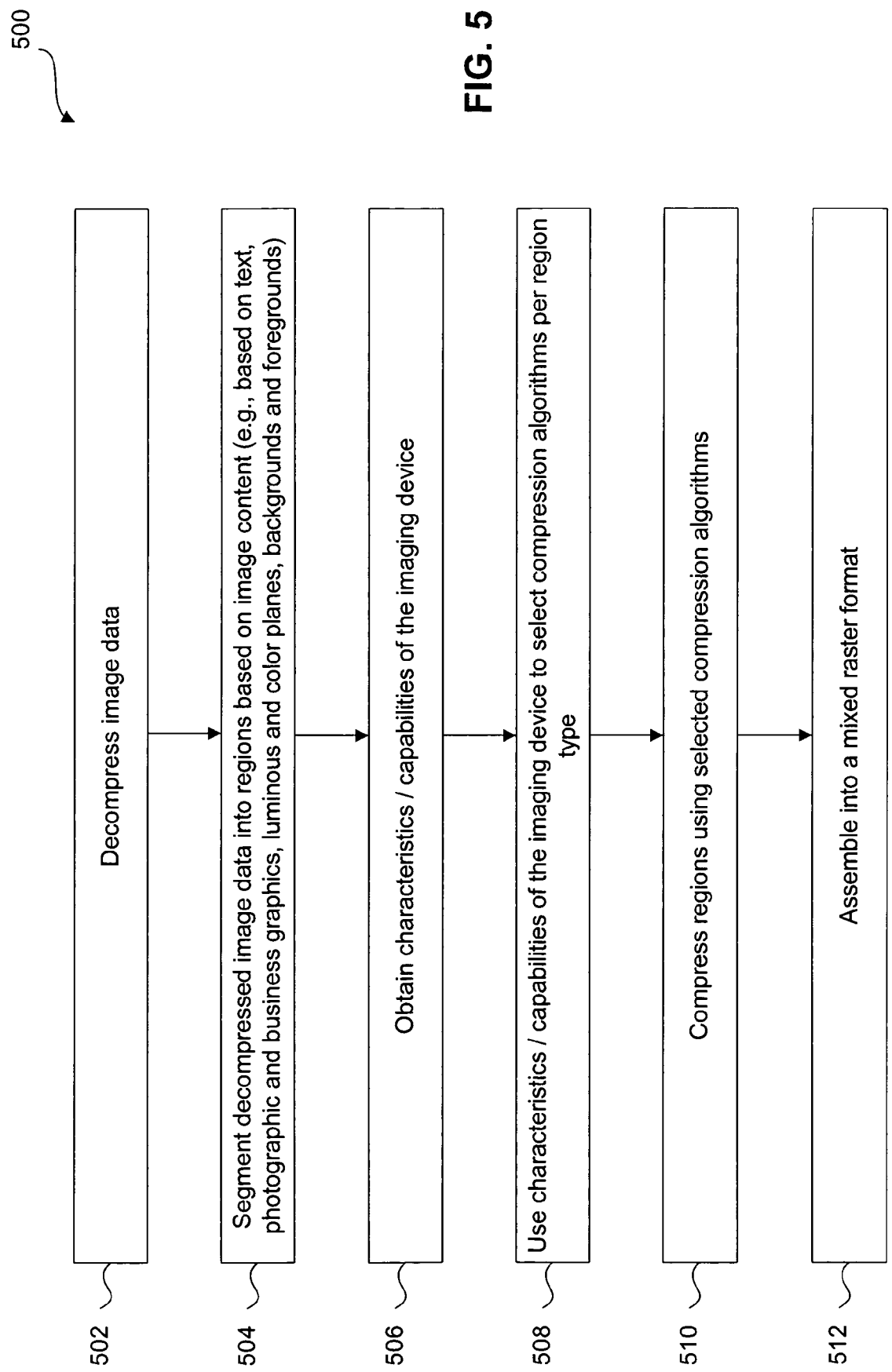
FIG. 5 is a flow diagram of a method for an embodiment of the segmentation and compression process of FIG. 4.

FIG. 5 is a flow diagram of a method 500 for an embodiment of the segmentation and compression process 402 of FIG. 4. The image data is decompressed 502. The decompressed image data is then analyzed and segmented 504 into regions based on the image content. The data in each segmented region shares a common characteristic, such that when the data is compressed by a lossy algorithm and all the data in the region shares the same output quality. For example, the segmentation may be based on text, bitmaps and vectors. For each type of region, the process 402 has one or more candidate compression algorithms. Each candidate compression algorithm has a performance rating relative to the type of region and what factors, if any, would result in a loss of output quality. Segmenting may be based on text, photographic and business graphics, luminous and color planes, on backgrounds and foregrounds, etc.

The process then queries 506, or obtains by other means, the characteristics/capabilities of the device, which may effect the selection of the compression algorithms. For example, the characteristics/capabilities may include information about mixed raster support, decompression methods, half-toning algorithms, artifact removal and resolution (DPI). The process uses 508 the characteristics/capabilities supported by the device to pick the compression algorithm per region type that will result in the best performance without lowering the output quality. Each region is then compressed 510 accordingly and assembled 512 into a mixed raster format.

Figure 7:
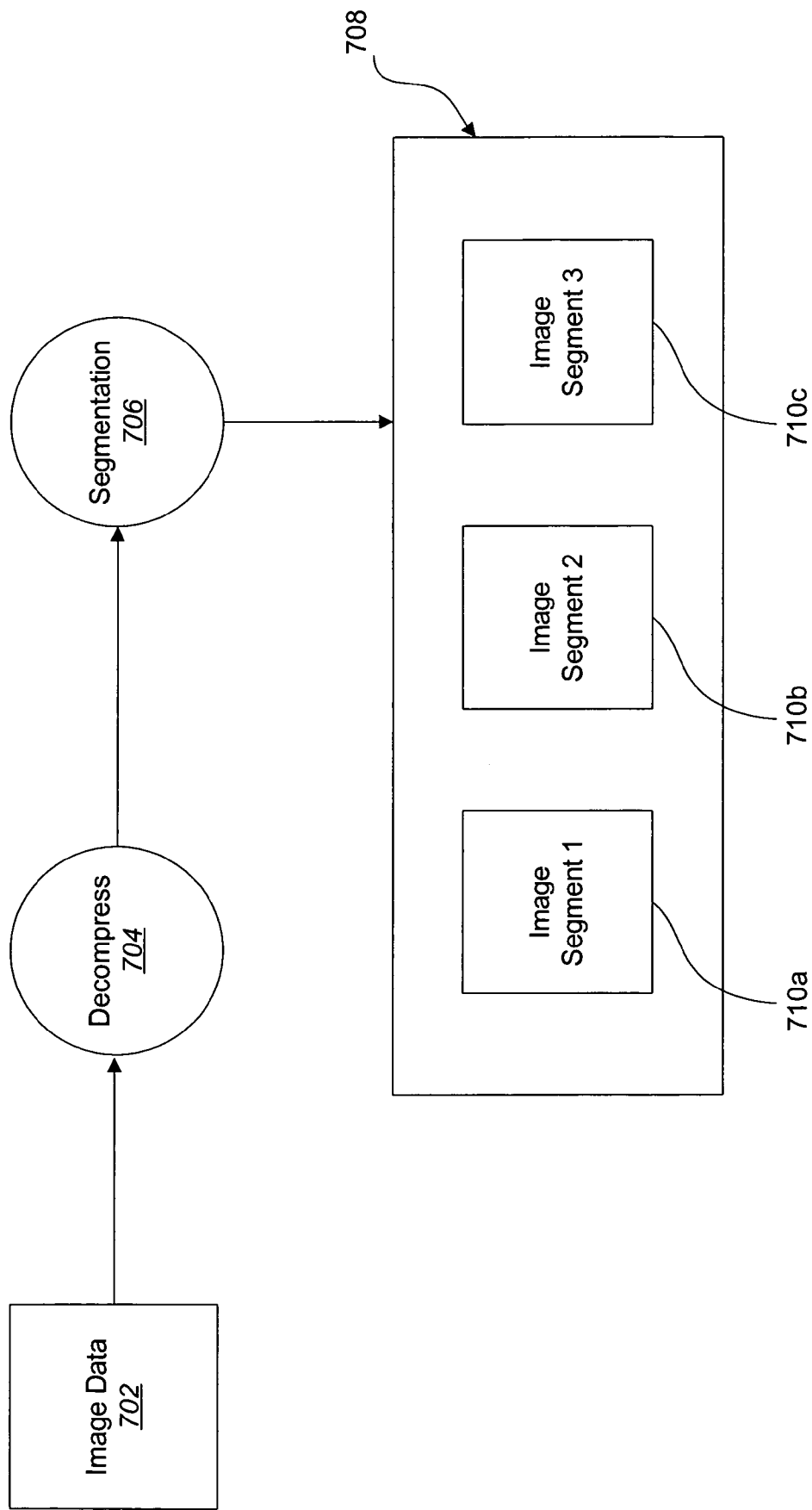
FIG. 7 is a logical block diagram illustrating the decompression and segmentation performed by a direct submit application.

Various embodiments are described below. First, one method for obtaining the characteristics/capabilities of an imaging device 404, as they relate to the image format and compression support, and other image processing factors that effect the performance and quality of the output are disclosed in FIG. 6. Then a method for segmenting image data into regions, which share a common set of characteristics, is shown in FIG. 7. The determination of which compression algorithms to apply to each region type to obtain the best performance on the target imaging device without reducing the quality of the output is illustrated with FIG. 8.

FIG. 6 is a logical block diagram illustrating the segmentation and compression process obtaining an imaging device's characteristics and/or capabilities. The region segmentation and compression process may be implemented in any piece of software or hardware upstream from an imaging device, such as in a direct submission application 602 running on a client or server computing device. Hereinafter, the above upstream process will be referred to as the direct submit application 602.

The direct submit application 602 obtains characteristics and capabilities 606 of the imaging device 604. This information can be obtained by any means, such as, but not limited to: (1) querying the device using an industry standard (e.g., SNMP) or proprietary device management protocol, (2) querying an imaging service 608 (e.g., printer directory service) where the imaging device's characteristics/capabilities 606b are registered, (3) querying an imaging device model database 610 where characteristics/capabilities 606c of specific imaging device models are stored (e.g., printer model database).

The set of characteristics/capabilities 606 obtained relate to the device's support for image data formats 612 and compression methods 614 and other image processing factors 616 that effect the performance and quality of the output. The following characteristics/capabilities are exemplary and are not meant to limit what possible characteristics/capabilities may be used with the systems and methods herein. One kind of capability that may be obtained is what image file formats 612 are supported. For example, this capability may indicate whether the imaging device supports TIFF, JFIF, Windows Bitmaps, Mixed (Layered) Raster, Multi-Image formats, etc. Another characteristic or capability that may be obtained is the compression method or methods 614 that the imaging device supports. For example, this capability may indicate whether the imaging device supports G3, G4, JPEG, JPEG2000, etc. A still further characteristic or capability that may be obtained is the color support 618 of the device. For example, does the imaging device support RGB, CMYK, bi-tonal, grayscale, etc. This information may also include the device's color gamut. Another characteristic or capability that may be obtained relates to image processing 616. For example, this information may indicate if the imaging device supports half-toning techniques, error diffusion, K-substitution, artifact removal, resolution (DPI), etc.

FIG. 7 is a logical block diagram illustrating the decompression and segmentation performed by the direct submit application 602, which is one embodiment of the segmentation and compression process 402. The direct submit application 602 receives the image data 702, decompresses 704 the image data, and segments 706 the image data 708 into regions 710. The image data in each region 710 corresponds to a region type, where a region type is defined as follows: when all the image data in the region is compressed by a lossy compression algorithm, the resulting data when decompressed and imaged processed results in a uniform loss, if any, of output quality.

Any segmentation 706 technique that achieves the above can be used. For example, the image data segmentation may be based on, but is not limited to: segmenting based on text, photographic and business graphics; segmenting based on luminous and color planes, segmenting based on backgrounds and foregrounds, etc.

Figure 8:
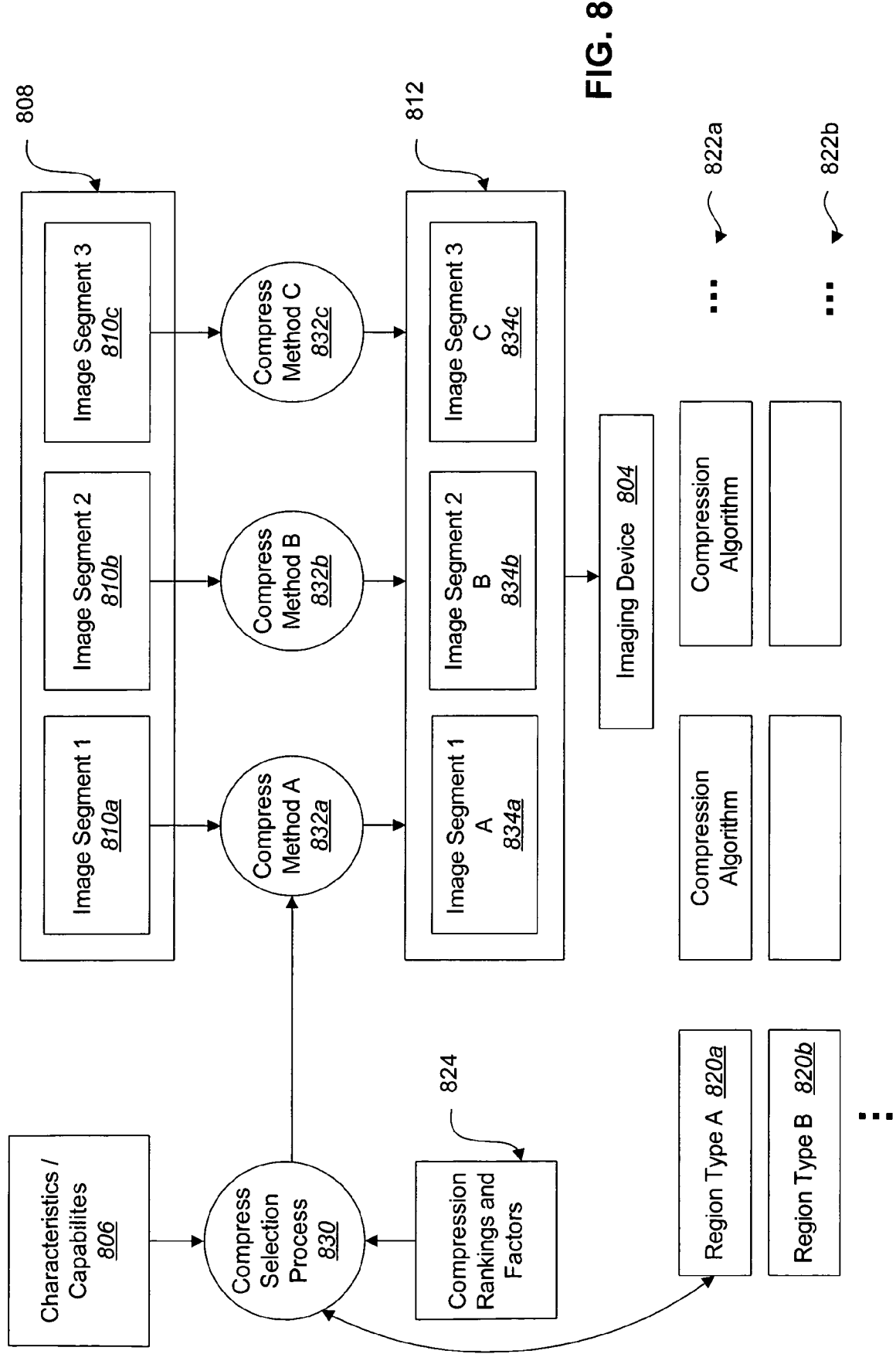
FIG. 8 is a logical block diagram illustrating compressing the segmented image data into a mixed raster.

FIG. 8 is a logical block diagram illustrating compressing the segmented image data 808 into a mixed raster 812. Once the image data is segmented in regions 810 of region types, the direct submit application 602 selects the compression algorithm for the region type that will result in the best performance without reducing the output quality.

First, each region type 820 has associated with it a set 822 of candidate compression algorithms. Each algorithm 822 is ranked according to its performance capabilities relative to the region type and what imaging processing factors, if any, would result in a loss of output quality. Compression rankings and factors 824 include this information. Examples of imaging processing factors include, but are not limited to: (1) half-toning algorithms, (2) output intent, (3) device color gamut, (4) device resolution, (5) artifact removal, (6) image enhancements (e.g., red-eye removal).

Next, the direct submit application 602 eliminates the candidate compression algorithms 822 which are not supported by the device determined by using the characteristics and capabilities 806 of the device. The direct submit application 602 then determines whether the device supports mixed raster or only a single compression (i.e., all the image data must be compressed using a single compression algorithm). In the latter case (no mixed-raster support), the process 830 picks the best performance ranked algorithm that is common to all the regions and which has no loss of output quality for the type of imaging output based on the imaging processing factors and the device's characteristics/capabilities. In the former case (mixed raster is supported), a compression algorithm 822 is selected on a per region type. For each region 810, the process 830 picks the best performance ranked algorithm and which has no loss of output quality for the type of imaging output based on the imaging processing factors and the device's characteristics/capabilities. As a result, each region 810 is compressed according to a selected compression method 832. The mixed raster 812 is then sent to the imaging device 804. The mixed raster 812 includes the different compressed regions 834.

Several examples will now be described. Many other implementations are possible besides these selected examples. The first example is with text. In this example, the region consists of image data that is scanned computer text. This is one type of image data that is known in the art where very high levels of compression can be achieved. For example, computer text of the same font type would all have the same grayscale value. But when scanned in, subtle variances could be introduced where the grayscale values of the text is not a single uniform value. Generally, the more variance in the grayscale will result in reduced performance (i.e., degree of compression), such as in a run-length encoding. If the region is textual and of the same font, then a better performance compression method can be achieved without loss of output quality, if all the grayscale values are replaced with a single grayscale value, such as an average or mean.

Further levels of compression could be achieved if the font type can be recognized or approximated to a known font type. In this case, the image data could be processed by an Optical Character Recognition ("OCR") system to extract the textual information. The region could then be compressed by storing information on the font type and the ASCII text equivalent, which itself may be further compressed. If the font type is not needed (only textual data is needed) for the imaging output, then even a higher level of compression can be achieved by storing only the compressed ASCII text without the font information.

The second example involves a photographic image on a black and white printer. In this example, the region consists of color photographic image data and the imaging operation is printing output on a black and white printer. In this case, only the luminous information is required, since the printer has no color capability. This region could then be compressed by extracting only the luminous information and further compressing the luminous information. For example, the color information (i.e., color space) of the image data could be converted to a Lab color space, where the L represents the luminous information. In this example, only the L information is needed and the a and b channels can be discarded.

The third example involves a bitmap screen shot. In this example, the image data consists of a computer screen shot. Typically, screen shots consists of vast amounts of uniform background color. The background region could be separated from the foreground images. The background region could then be compressed as a simple run-length encoding of a single color value and the area dimension.

The fourth example involves imaging processing. The selection of compression algorithms may also be affected by the imaging processing characteristics/capabilities of the device. For example, some lossy compression algorithms, like JPEG, achieve compression rates by reducing the bit-depth of the information. This reduction can result in artifacts, false images, introduced when the data is decompressed. Some imaging systems have the capability of compensating for this by detecting and eliminating the artifacts. For these systems, these algorithms can be considered without a loss of output quality.

It is also known in the art that different half-toning algorithms combined with the output intent can also effect the output quality for different types of image data. These factors can also be considered. Further, if the device has the capability of applying different half-toning and/or output intents to different regions of a raster image, then the image data could be further augmented to instruct the imaging device which half-toning and/or output intent algorithms to use on the region. In another embodiment, the half-toning algorithms are performed by the direct submit application.

The present systems and methods may be implemented in many different embodiments. Other embodiments include but are not limited to the spooling and despooling subsystems of the Microsoft Windows operating system, the Apple MacIntosh operating system, the Linux operating system, System V Unix operating systems, BSD Unix operating systems, OSF Unix operating systems, Sun Solaris operating systems, HP/UX operating systems, other UNIX operating systems and IBM Mainframe MVS, AS/400 and OS/390 operating systems.

Although use with a printer was illustrated, it will be appreciated that the present systems and methods may be applied to other embodiments. For example, the present systems and methods may be applied to fax, scan and document operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for compressing image data being sent to an imaging device, the method comprising:
    obtaining capabilities of an imaging device;
    decompressing image data upstream from a rasterization process of the imaging device;
    dividing the image data into one or more regions based on image data content;
    selecting a compression algorithm for each region based on content of each region and on the capabilities of the imaging device, wherein the compression algorithm for each region is selected based on output quality and wherein compression rankings are used in selecting a compression algorithm for each region, wherein each compression algorithm is ranked according to its performance capabilities relative to the region type;
    compressing the image data per region using one or more selected compression algorithms; and
    assembling the compressed regions into a mixed raster format.

2. The method of claim 1, wherein data in each region shares a common characteristic such that when the data is compressed by a lossy algorithm all the data in the region shares the same output quality.

3. The method of claim 1, wherein the image data is divided into one or more regions based on text, line art and graphics.

4. The method of claim 3, wherein the image data is divided into one or more regions further based on luminous planes, color planes, backgrounds and foregrounds.

5. The method of claim 1, wherein the capabilities of the imaging device are obtained directly from the imaging device.

6. The method of claim 1, wherein the capabilities of the imaging device are obtained by querying an imaging service.

7. The method of claim 1, wherein the capabilities of the imaging device are obtained by querying an imaging device database.

8. The method of claim 1, wherein the capabilities comprise supported image file formats, supported compression methods, supported image rendering and enhancement methods, and supported color spaces and gamuts.

9. The method of claim 1, further comprising storing a plurality of region types and associating a plurality of candidate compression algorithms with each region type.

10. The method of claim 1, further comprising sending the mixed raster format of the image data downstream to a rasterization process of the imaging device.

11. A system configured to implement a method for compressing image data being sent to an imaging device, the system comprising:
    a computing device;
    executable instructions executable on the computing device, wherein the executable instructions are configured to implement a method comprising:
        obtaining capabilities of an imaging device;
        decompressing image data upstream from a rasterization process of the imaging device;
        dividing the image data into one or more regions based on image data content;
        selecting a compression algorithm for each region based on content of each region and on the capabilities of the imaging device, wherein the compression algorithm for each region is selected based on output quality and wherein compression rankings are used in selecting a compression algorithm for each region, wherein each compression algorithm is ranked according to its performance capabilities relative to the region type;
        compressing the image data per region using one or more selected compression algorithms; and
        assembling the compressed regions into a mixed raster format.

12. The system of claim 11, wherein data in each region shares a common characteristic such that when the data is compressed by a lossy algorithm all the data in the region shares the same output quality.

13. The system of claim 11, wherein the image data is divided into one or more regions based on one or more of the following: text, line art, graphics, luminous planes, color planes, backgrounds and foregrounds.

14. The system of claim 11, wherein the capabilities of the imaging device are obtained directly from the imaging device.

15. The system of claim 11, wherein the capabilities of the imaging device are obtained by querying a process that is not part of the imaging device.

16. The system of claim 11, wherein the capabilities comprise supported image file formats, supported compression methods, supported image rendering and enhancement methods and supported color spaces and gamuts.

17. The system of claim 11, further comprising a plurality of region types on the computing device that are each associated with a plurality of candidate compression algorithms.

18. The system of claim 17, further comprising compression rankings on the computing device that are used in selecting a compression algorithm for each region.

19. The system of claim 18, wherein the computing device is in electronic communication with the imaging device and wherein the implemented method further comprises sending the mixed raster format of the image data to the imaging device.

20. A computer-readable medium for storing program data, wherein the program data comprises executable instructions for implementing a method in a computing device for compressing image data being sent to an imaging device, the method comprising:

obtaining capabilities of an imaging device;

decompressing image data upstream from a rasterization process of the imaging device;

dividing the image data into one or more regions based on image data content;

selecting a compression algorithm for each region based on content of each region and on the capabilities of the imaging device, wherein the compression algorithm for each region is selected based on output quality and wherein compression rankings are used in selecting a compression algorithm for each region, wherein each compression algorithm is ranked according to its performance capabilities relative to the region type;

compressing the image data per region using one or more selected compression algorithms; and assembling the compressed regions into a mixed raster format.

21. The computer-readable medium of claim 20, wherein the capabilities of the imaging device are obtained directly from the imaging device.

22. The computer-readable medium of claim 20, wherein the capabilities of the imaging device are obtained by querying an imaging service.

23. The computer-readable medium of claim 20, wherein the capabilities of the imaging device are obtained by querying an imaging device database.

24. The computer-readable medium of claim 20, wherein the capabilities comprise supported image file formats, supported compression methods, supported image rendering and enhancement methods and supported colors.

25. The computer-readable medium of claim 20, further comprising storing a plurality of region types and associating a plurality of candidate compression algorithms with each region type.

26. The computer-readable medium of claim 25, further comprising using compression rankings in selecting a compression algorithm for each region.

27. The computer-readable medium of claim 20, further comprising sending the mixed raster format of the image data downstream.

* * * * *